June 12, 1923.
G. W. OTTERSON
1,458,240
ASH COLLECTOR OR LIKE SELF LOADING VEHICLE
Filed May 5, 1923    2 Sheets-Sheet 2
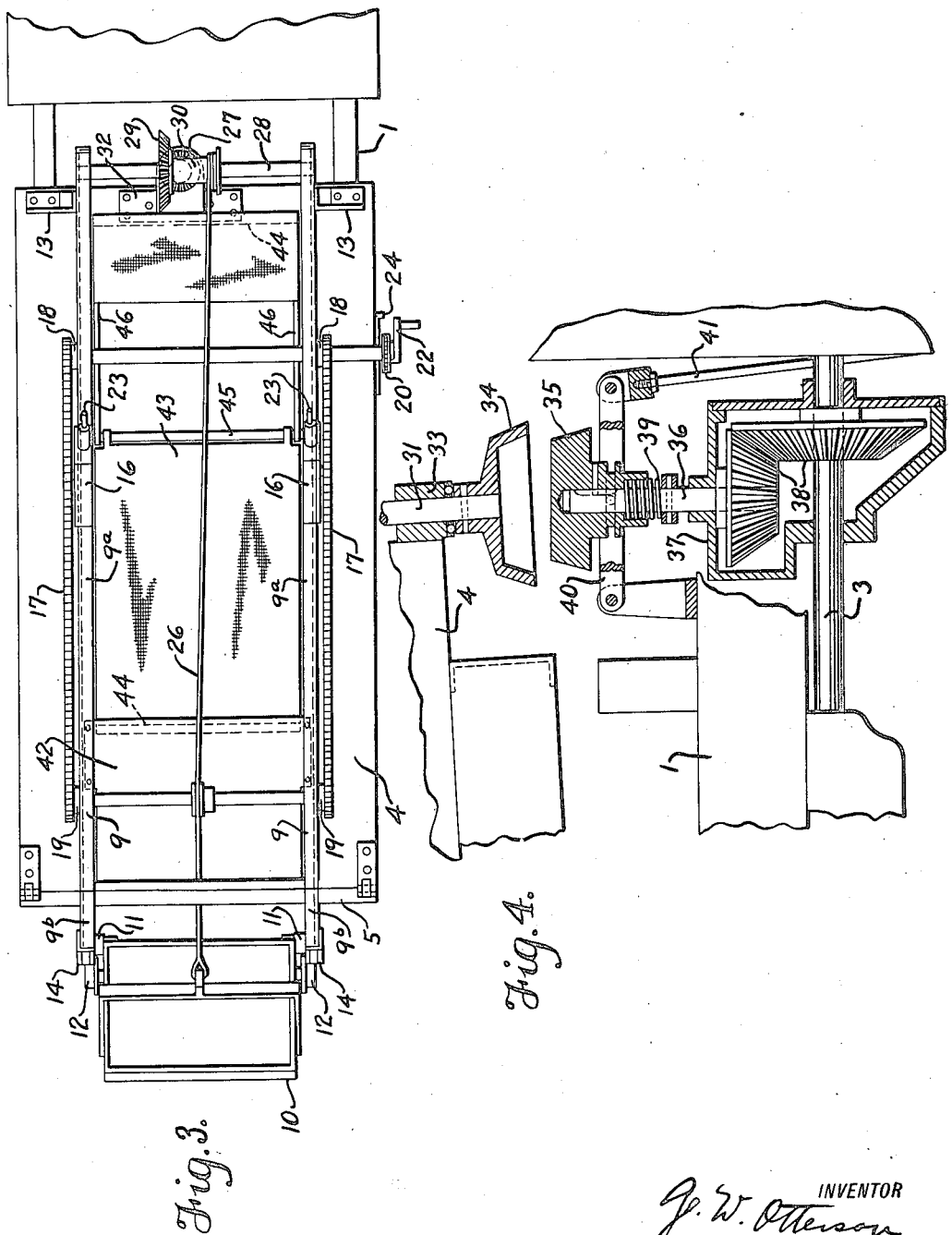

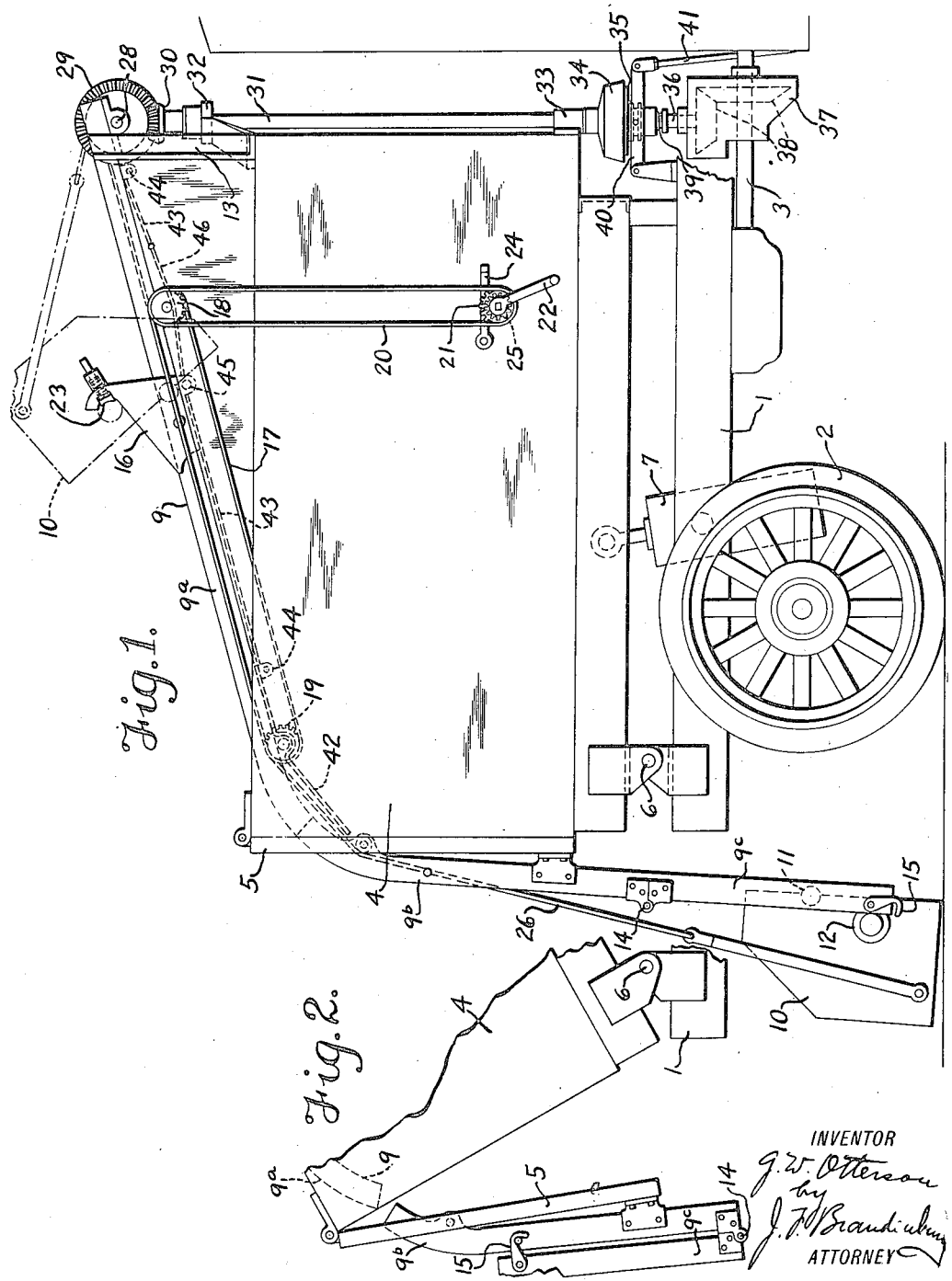

Patented June 12, 1923.

1,458,240

UNITED STATES PATENT OFFICE.

GEORGE W. OTTERSON, OF SEATTLE, WASHINGTON.

ASH COLLECTOR OR LIKE SELF-LOADING VEHICLE.

Application filed May 5, 1923. Serial No. 636,865.

*To all whom it may concern:*

Be it known that I, GEORGE W. OTTERSON, a citizen of the United States, and a resident of Seattle, in the county of King and State of Washington, have invented a new and useful Ash Collector or like Self-Loading Vehicle, of which the following is a specification.

The object of the invention is to provide an advantageous self-loading motor truck vehicle adapted particularly for making ash and garbage collections in cities. To this end the invention may be said to comprise the parts, improvements and combinations hereinafter described with reference to a preferred embodiment and set forth generically and specifically in the claims.

In the accompanying drawings, forming a part hereof:

Fig. 1 is a side elevation, the forward part of the vehicle being omitted;

Fig. 2 is a fragmentary side elevation of the rear end portion of the vehicle, showing the dumping condition;

Fig. 3 is a plan view; and

Fig. 4 is an enlarged sectional view showing the separable means for driving the loader, the parts being shown as if the vehicle body were slightly tilted.

The numeral 1 designates the chassis of a motor truck, and 2 its rear wheels. In the chassis is a longitudinal power shaft 3, driven from the engine (not shown) that drives the vehicle. This shaft may be the driving shaft of the vehicle in advance of the transmission, or it may be a special shaft connected with one of the power take-offs which are familiar in commercial trucks, the arrangement in any event being such that this shaft can be driven by the engine when the vehicle is at rest. Such matters being well known, require no special illustration.

Mounted on the chassis is a tiltable, rear-dumping cargo body 4, having a top hinged rear-gate 5 adapted to swing rearward. The hinge connection permitting the body to pivot in this manner is illustrated at 6, and the cylinder 7 is illustrative of any customary or suitable power means for up-tilting the body to discharge its contents.

Mounted on the tiltable body is a power-operated rear-end loader comprising a track 9 and a car 10 movable thereon from a point near the ground upward to dump its load into the body, and back again. The track comprises laterally spaced channel rails, the channels receiving forward rollers 11 on the car, while rear rollers 12 travel on the outer and upper flanges. From the lower end this track extends substantially vertically upward close to the rear end of the body, near the top of which it curves forward and thence extends at an inclination forward and upward longitudinally over the top of the body and substantially to its forward end. The longitudinally inclined section $9^a$ of the track is fixedly mounted on the body by the aid of suitable frame members 13. The rear section $9^b$ is separate from the section $9^a$ and is secured to the hinged gate 5, so as to be capable of swinging therewith out of the way when the body is tilted for dumping, as seen in Fig. 2. The bottommost section $9^c$ is hinged at 14 to the lower end of the section $9^b$, and can be folded up and caught when the loader is not in action and particularly when the body is to be dumped. A suitable catch is represented at 15.

On the upper section $9^a$ of the track is a dumping spur 16 which inclines upward at a steeper angle from the section $9^a$ and is arranged to switch the rollers 12 upward thereon, while the rollers 11 continue in the channels of the track rails, the result being that the car has its rear end uptilted so that its load is deposited in the body 4 (Fig. 1).

The dumping spur comprises two members, one on each track rail, and mounted so as to be adjustable therealong, in order that as one part of the body becomes sufficiently filled the dumping or depositing point may be shifted lengthwise of the body until the general interior is substantially evenly loaded. To this end the dumping spur members are slidably engaged with the track rails and means are provided for shifting them forward and rearward thereon. The spur members are secured to the upper stretches of longitudinally extending endless cables or sprocket chains 17, which pass about forward and rearward sprocket wheels or pulleys 18, 19 on the two sides of the track frame, the corresponding wheels at opposite sides being united by transverse shafts. A chain or cable 20 acting on one of these axes and leading downward to a wheel 21 having a hand crank 22 on the lower part of one side of the body enables the attendant to shift the spur members simultaneously along the track as desired. In this way the car can be caused to discharge at any point from the front to the rear part of the body. The spur members have spring bumpers or limit abutments 23. In any position the dumping spur is locked and held by a dog 24 cooperative with a toothed wheel 25 fixed with the wheel 21.

The car 10 is hoisted and lowered by means of a cable 26 which passes from the car over suitable guides to a hoisting drum 27 on a transverse shaft 28 journaled on the frame at the front end of the track.

The said shaft 28 bears a gear 29 meshed by a gear 30 on the upper end of a vertical shaft 31 extending vertically downward at the front end of the body, whereon it is journaled and supported by brackets 32, 33. The lower end of this shaft carries a friction cone clutch member 34.

The complementary driving member 35 is on the upper end of a short vertical shaft 36 projecting upward from a gear-case 37 mounted in the chassis, this shaft being driven by the shaft 3 through suitable gears 38. This friction member is slidably splined on its shaft, so as to be capable of yielding when the body 4, after having been tilted to dump, is lowered to its normal position bringing the member 34 down on the member 35, and is sustained by a spring 39 so as to produce a driving engagement. The cone clutch elements thus constitute embodiments of separable driving and driven elements carried by the chassis and tiltable body respectively whereby the loader can be driven when the body is down. They also afford a clutch for throwing the power on and off the loader at the proper times, a means for holding the car at the top in dumping position for the necessary brief period, and a means for effecting controlled lowering of the car, all as claimed broadly in a copending application. To these ends means are provided for shifting the clutch member 35 by the atendant, the said means being shown as comprising a yoke lever 40 and a link 41, which will be understood as passing to a handle or pedal at a suitable point. When the car is brought up against the bumpers 23 the clutch automatically slips, so that injury is prevented and the power merely serves to hold the car upturned against the buffer. Then, after the car has deposited the ashes or other material in the body, the operator moves the clutch member 35 very slightly against the action of the spring, so that the clutch slips more freely, permitting the car to descend, the rate of such descent being very easily controlled by the operator regulating the friction between the driving member turning in one direction and the driven member rotated by the weight of the car in the opposite direction.

The top of the body, except for the space between the track rails where the car has to dump, is enclosed by a cover comprising plates 42 suitably fitted to the spaces. In order to close the opening between the rails over the body 4 as much as may be, extensible and contractible closures are provided at front and rear of the spur members 16 and connected thereto, so that when the dumping spur is moved forward or rearward one closure automatically extends and the other shortens, and vice-versa, always leaving an interval through which the car can dump. These closures may take the form, for example, of flexible strips 43 substantially the width of the opening, wound and unwound from transverse spring shade rollers 44 mounted toward opposite ends of the top of the body, the rear strip being connected at its forward end to a rod 45 connecting the dumping spur members, and the rear end of the forward member being connected to the same rod by cables 46 which leave the necessary dumping opening.

The operation will be briefly summarized. The vehicle having reached a point of collection is brought to rest, and the car 4 is lowered to the bottom of the track 9. The engine is to be understood as running and rotating the shaft 3. The clutch member 35 is held out while the car is receiving its load, and then put into driving engagement with the complementary member 34. This causes the car to be hoisted to the upper portion of the track and there upturned so that its contents fall into the body. The clutch slips at this time and next the operator causes the clutch to slip further so that the car runs down the track under the control of the operator. The car is reloaded and the operation is repeated. When one portion of the interior of the body becomes sufficiently filled the dumping spur is moved to a new point longitudinally of the body, and this may be done several times so that the body becomes evenly filled from front to rear. When the body has been sufficiently loaded the vehicle is driven to the appropriate spot, the rear gate unlocked, and the body uptilted to dump. In this operation the drive for the hoist separates at the clutch members 34, 35, the clutch member 34 rising away from the member 35. On again lowering the body the spring 39 cushions the contact of the members, preventing shock to the shafts and bearings. When the machine is traveling or the loader is not in use, the clutch is held out in an appropriate manner.

While the preferred embodiment of the invention has been described in detail, it will be understood that numerous other and specifically different embodiments are possible, and I do not therefore wish to limit myself to the precise construction illustrated.

What I claim as new is:

1. A self-loading vehicle having a cargo body, a track extending upward at the rear end of the body and thence forward lengthwise over the top of the body, a car and means for drawing the same up and along the track, and a dumping spur having an inclined surface adapted to engage and dump said car and positionable at different points along the upper portion of the track.

2. A self-loading vehicle having a cargo body, a track extending upward at the rear end of the body and thence forward lengthwise over the top of the body, a car and means for drawing the same up and along the track, a dumping spur positionable at different points along the upper portion of the track and a bumper carried by said spur and adapted to be engaged by said car as it reaches dumping position.

3. A self-loading vehicle having an under frame, a tiltable cargo body thereon, said body having a movable rear gate, a track extending upward at the rear end of the body and thence forward over the top of the body, said track comprising a rear section carried by the movable rear gate and a fixed upper section carried by the body, a car and means for drawing the same up and along the track.

4. A self-loading vehicle having an under frame, a tiltable cargo body thereon, said body having a movable rear gate, a track extending upward at the rear end of the body and thence forward over the top of the body, said track comprising a rear section carried by the movable rear gate, and having a foldable bottom section, and a fixed upper section carried by the body, a car and means for drawing the same up and along the track.

5. A self-loading vehicle having a cargo body, a track extending upward at the rear end of the body and thence forward lengthwise over the top of the body, a shiftable dumping spur on said track, a car and means for drawing the same up and along the track, the top of the body being covered, with a longitudinal opening within the track to admit the material, and movable closures for said opening in front and rear of the shiftable dumping spur and connected therewith.

6. A self-loading vehicle having a chassis, a power shaft therein, a tiltable cargo body, a track extending upward at the rear end of the body and thence forward over the top of the body, a car movable on said track, a hoisting drum at the forward end of the track connected with the car, a vertical shaft on the forward end of the tiltable body, a driven member on the lower end of said shaft, and a cooperative driving member on the chassis connected with the power shaft.

7. A self-loading vehicle having a chassis, a power shaft therein, a tiltable cargo body, a track extending upward at the rear end of the body and thence forward over the top of the body, a car movable on said track, a hoisting drum at the forward end of the track connected with the car, a vertical shaft on the forward end of the tiltable body, a driven member on the lower end of said shaft, a cooperative driving member on the chassis connected with the power shaft, said members constituting a friction clutch which separates automatically when the body is tilted, and operator's means for controlling the clutch when the body is in normal position.

GEORGE W. OTTERSON.